(12) United States Patent
Maki et al.

(10) Patent No.: US 12,390,817 B2
(45) Date of Patent: Aug. 19, 2025

(54) BLOWOFF NOZZLE

(71) Applicant: Toray Industries, Inc., Tokyo (JP)

(72) Inventors: Akihisa Maki, Otsu (JP); Shigeki Chieda, Nasushiobara (JP); Hiroki Shoji, Otsu (JP)

(73) Assignee: Toray Industries, Inc., Tokyo (JP)

( * ) Notice: Subject to any disclaimer, the term of this patent is extended or adjusted under 35 U.S.C. 154(b) by 392 days.

(21) Appl. No.: 17/763,722

(22) PCT Filed: Oct. 2, 2020

(86) PCT No.: PCT/JP2020/037654
§ 371 (c)(1),
(2) Date: Mar. 25, 2022

(87) PCT Pub. No.: WO2021/075282
PCT Pub. Date: Apr. 22, 2021

(65) Prior Publication Data
US 2022/0323971 A1    Oct. 13, 2022

(30) Foreign Application Priority Data
Oct. 17, 2019   (JP) .................................. 2019-190269

(51) Int. Cl.
*B05B 1/02*   (2006.01)
*B05B 1/00*   (2006.01)
(Continued)

(52) U.S. Cl.
CPC ............... *B05B 1/02* (2013.01); *B05B 1/005* (2013.01); *B29C 55/12* (2013.01); *B29K 2101/12* (2013.01); *B29L 2007/008* (2013.01)

(58) Field of Classification Search
CPC   B05B 1/005; B05B 1/02; B29C 55/12; B29C 35/045; B29C 35/06; B29C 55/14;
(Continued)

(56) References Cited

U.S. PATENT DOCUMENTS 3,549,070 A    12/1970  Frost et al.
4,261,516 A *   4/1981  Tillman .................. B05B 1/005
                                                239/DIG. 21
(Continued)

FOREIGN PATENT DOCUMENTS

CN           2273838      2/1998
CN          101801644     8/2010
(Continued)

OTHER PUBLICATIONS

Chinese Office Action for Chinese Application No. 202080072494.8, dated Sep. 27, 2023 with translation, 12 pages.
(Continued)

*Primary Examiner* — Qingzhang Zhou
(74) *Attorney, Agent, or Firm* — Buchanan Ingersoll & Rooney PC

(57) ABSTRACT

A blower nozzle is a blower nozzle that blows out the air to a film being conveyed, and that includes an internally installed portion that is provided near a position where the air is blown out, inside the blower nozzle, and that has inclined surfaces inclined with respect to a virtual plane passing through an opening surface of an opening of the blower nozzle, the opening surface being a surface from which the air is blown out, the inclined surfaces being inclined in a manner being closer to each other toward the virtual plane.

1 Claim, 5 Drawing Sheets

(51) Int. Cl.
  *B29C 55/12* (2006.01)
  *B29K 101/12* (2006.01)
  *B29L 7/00* (2006.01)

(58) Field of Classification Search
  CPC ......... B29C 55/16; B29C 55/10; B29C 35/16; B29C 2035/1658; B29C 2035/046; B29K 2101/12; B29L 2007/008; B29L 2007/00
  See application file for complete search history.

(56) References Cited

U.S. PATENT DOCUMENTS

| | | | | |
|---|---|---|---|---|
| 4,431,135 | A | * | 2/1984 | Kaye ................ B05B 1/005 |
| | | | | 417/198 |
| 5,156,312 | A | * | 10/1992 | Kurie ................ F26B 13/104 |
| | | | | 34/643 |
| 5,395,029 | A | | 3/1995 | Kurie |
| 6,108,939 | A | | 8/2000 | Kittsteiner et al. |
| 6,155,518 | A | | 12/2000 | Bannenberg |
| 6,202,323 | B1 | | 3/2001 | Möller |
| 8,584,768 | B2 | * | 11/2013 | Trapp ................ A62C 31/03 |
| | | | | 239/455 |
| 2001/0051042 | A1 | | 12/2001 | Ohmura |
| 2010/0283191 | A1 | | 11/2010 | Takahata et al. |
| 2014/0013612 | A1 | | 1/2014 | Lee et al. |
| 2017/0044594 | A1 | | 2/2017 | Wang et al. |
| 2018/0311866 | A1 | | 11/2018 | Nishikawa et al. |

FOREIGN PATENT DOCUMENTS

| | | |
|---|---|---|
| CN | 102712133 | 10/2012 |
| CN | 102744851 | 10/2012 |
| CN | 108367485 | 8/2018 |
| JP | 6098634 U | 7/1985 |
| JP | 2001204536 A | 7/2001 |
| JP | 2014202464 | 10/2014 |
| KR | 10-2018-0097508 A | 8/2018 |
| WO | 9747449 A1 | 12/1997 |
| WO | 2017011565 A1 | 1/2017 |
| WO | 2017115654 A1 | 7/2017 |

OTHER PUBLICATIONS

Extended European Search Report for European Application No. 20877832.4, dated Dec. 9, 2022, 6 pages.
International Search Report and Written Opinion for International Application PCT/JP2020/037654, dated Nov. 10, 2020, 5 pages.
Office Action (Request for the Submission of an Opinion) issued Jun. 13, 2025, by the Korean Intellectual Property Office in corresponding Korean Patent Application No. 10-2022-7008563 and an English translation of the Office Action. (9 pages).

* cited by examiner

BLOWOFF NOZZLE

CROSS REFERENCE TO RELATED APPLICATIONS

This application is the U.S. National Phase application of PCT/JP2020/037654 filed Oct. 2, 2020, which claims priority to Japanese Patent Application No. 2019-190269, filed Oct. 17, 2019, the disclosures of these applications being incorporated herein by reference in their entireties for all purposes.

FIELD OF THE INVENTION

The present invention relates to a blowoff nozzle.

BACKGROUND OF THE INVENTION

As methods for producing stretched films made of thermoplastic resin, sequential biaxial stretching, and simultaneous biaxial stretching have been known. With the sequential biaxial stretching, an unstretched film made of thermoplastic resin is stretched in its longitudinal direction to obtain a uniaxially stretched film, and then the obtained uniaxially stretched film is put into a tenter oven and stretched in its width direction. With the simultaneous biaxial stretching, an unstretched film made of thermoplastic resin is put into a tenter oven and stretched inside the oven in its longitudinal direction and the width direction simultaneously.

Stretched films made of thermoplastic resin are widely used for various industrial material applications, such as those for packaging. Among such films, sequential biaxially stretched films made of polyester, polyolefin, or polyamide resin are widely used due to their excellent properties such as mechanical, thermal, and electrical properties, in applications where unstretched films are not usable, and the demand for the sequential biaxially stretched films has been increasing.

A problem with a tenter oven used in manufacturing a stretched film made of thermoplastic resin is that circulation of the air does not complete within the chamber that makes up the tenter oven. For example, the tenter oven experiences phenomena in which the air flows into an adjacent chamber with a different temperature setting, in which the air from the outside of the tenter oven flows into the oven, and in which the air inside the chamber blows out of the oven. All of these phenomena are phenomena in which the air flows along the direction in which the film is conveyed, and this kind of the air flow is referred to as a machine-direction (MD) flow. Such an MD flow is caused by, for example, an airflow that accompanies the film as the film is conveyed, and a discrepancy between the amount of heated air supplied into the tenter oven and the amount of the air exhausted from the tenter oven.

When an MD flow is generated, because the incoming air with a different temperature from the outside of the chamber becomes mixed with the heated air inside the chamber, as the incoming air flows near the film, the film heating efficiency becomes inconsistent, and the film is subjected to extensive temperature unevenness. In the tenter oven, at least one of the following processes is performed: a preheating process for heating the film to a desired temperature; a stretching process for extending the film into a desired width; a thermal fixing process for applying a thermal treatment to the film at a desired temperature; and a cooling process for cooling the film to a desired temperature. If the temperature of the film becomes uneven during any of these processes, the film thickness may become uneven and the characteristics may become varied, and result in a deterioration of the product quality. In addition to the deterioration of the product quality, the film may become torn inside the tenter oven, and productivity may decline.

Known as a technology for preventing an MD flow from drawing the external air into the tenter oven, or from carrying the air inside the chamber to the outside of the tenter oven is a technology for causing a blowoff nozzle installed at a prior stage of the oven, being prior in the film conveying direction, to blow out the air to the film surface, so as to block such an airflow air (see Patent Literature 1, for example).

PATENT LITERATURE

Patent Literature 1: International Publication No. 2017/115654

SUMMARY OF THE INVENTION

In a stretched film manufacturing apparatus, it is preferable to keep the blowoff nozzle away from the film, from the viewpoint of the configuration of the apparatus. However, if the distance between the film and the blowoff nozzle is increased, the air pressure of the air blowing out of the blowoff nozzle drops, and becomes incapable of blocking the MD flow. The MD flow may then draw the external air into the tenter oven or carry the inside air to the outside of the tenter oven, and may increase the temperature unevenness near the film and inside the tenter oven.

The present invention was made in consideration of the above problem, and an object of the present invention is to provide a blowoff nozzle capable of suppressing temperature unevenness even when the distance between the nozzle and the film is increased.

To solve the above problem, a blowoff nozzle according to the present invention is a blowoff nozzle that blows out air to a film being conveyed. The blowoff nozzle includes an internally installed portion that is provided near a position where the air is blown out, inside the blowoff nozzle, and that has inclined surfaces inclined with respect to a virtual plane passing through an opening surface of an opening of the blowoff nozzle, the opening surface being a surface from which the air is blown out, the inclined surfaces being inclined in a manner being close to each other toward the virtual plane.

The blowoff nozzle according to the present invention further includes a protruding portion protruding from the internally installed portion to outside of the opening, the protruding portion having an inclined surface inclined with respect to the virtual plane.

In the blowoff nozzle according to the present invention, the opening includes first to third openings that are independent from one another, and the internally installed portion includes: a first internally installed portion provided between the first opening and the second opening, the first internally installed portion having an inclined surface that is inclined with respect to the virtual plane; and a second internally installed portion provided between the second opening and the third opening, the second internally installed portion having an inclined surface that is inclined with respect to the virtual plane.

The blowoff nozzle according to the present invention further includes a protruding portion protruding from the internally installed portion to outside of the opening, the protruding portion having an inclined surface that is inclined with respect to the virtual plane. The protruding portion includes: a first protrusion provided between the first opening and the second opening, the first protrusion having an inclined surface inclined with respect to the virtual plane; and a second protrusion provided between the second opening and the third opening, the second protrusion having an inclined surface inclined with respect to the virtual plane.

According to the present invention, it is possible to suppress temperature unevenness even when the distance between the film and the apparatus is increased.

DETAILED DESCRIPTION OF EMBODIMENTS OF THE INVENTION

Figure 1:
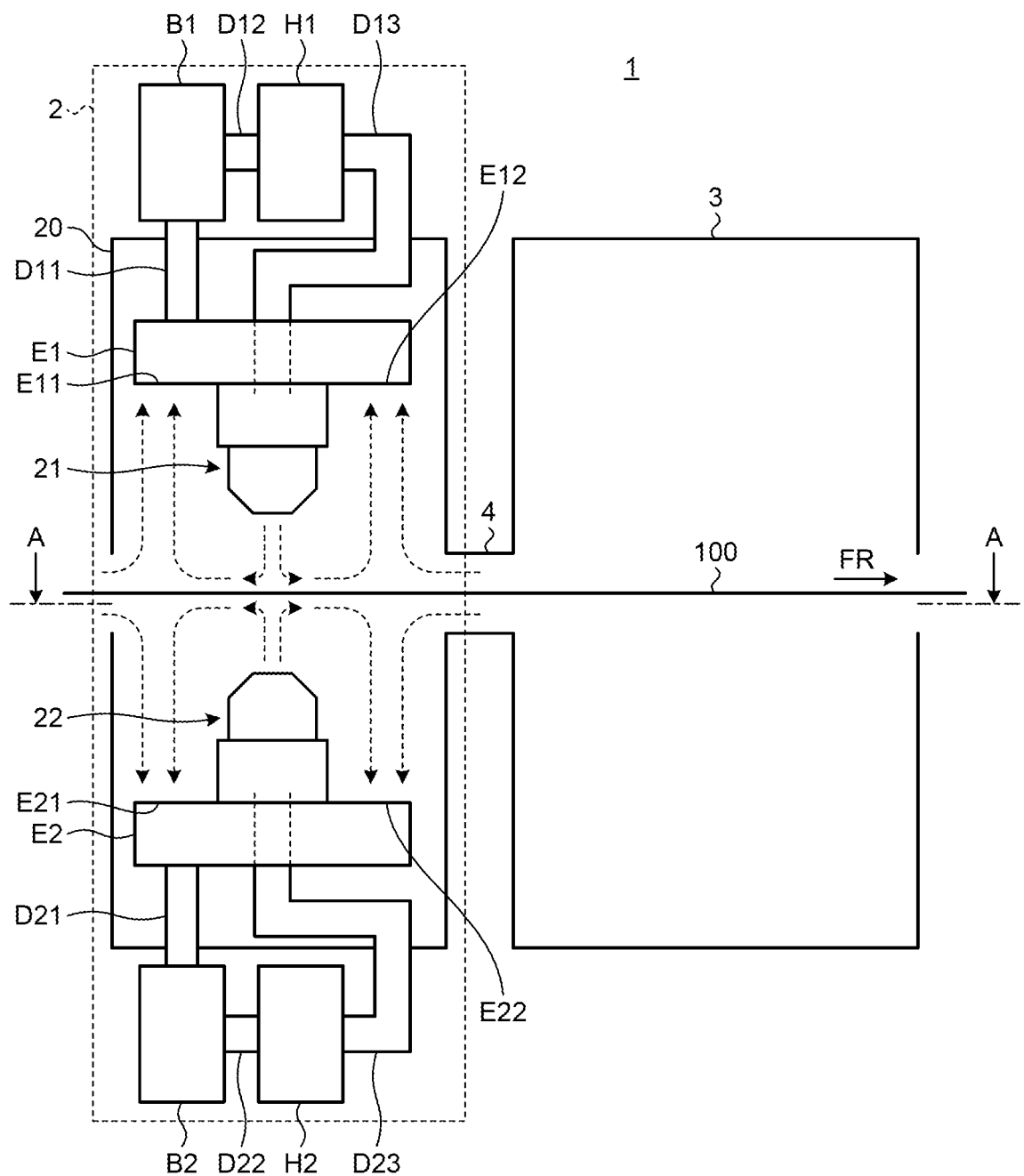
FIG. 1 is a schematic illustrating a configuration of a film manufacturing apparatus provided with a blowoff nozzle according to one embodiment of the present invention.

Some embodiments for implementing the present invention will now be explained with reverence to some drawings. The embodiments, however, are not intended to limit the scope of the present invention in any way. Furthermore, the drawings referred in the following description merely give schematic representations of the shapes, the sizes, and the positional relations according to the present invention to an extent allowing understanding of the present invention. In other words, the present invention is not limited only to the shapes, the sizes, and positional relations illustrated in the drawings. Furthermore, in the description of the drawings, the same parts are given the same reference signs.

Figure 2:
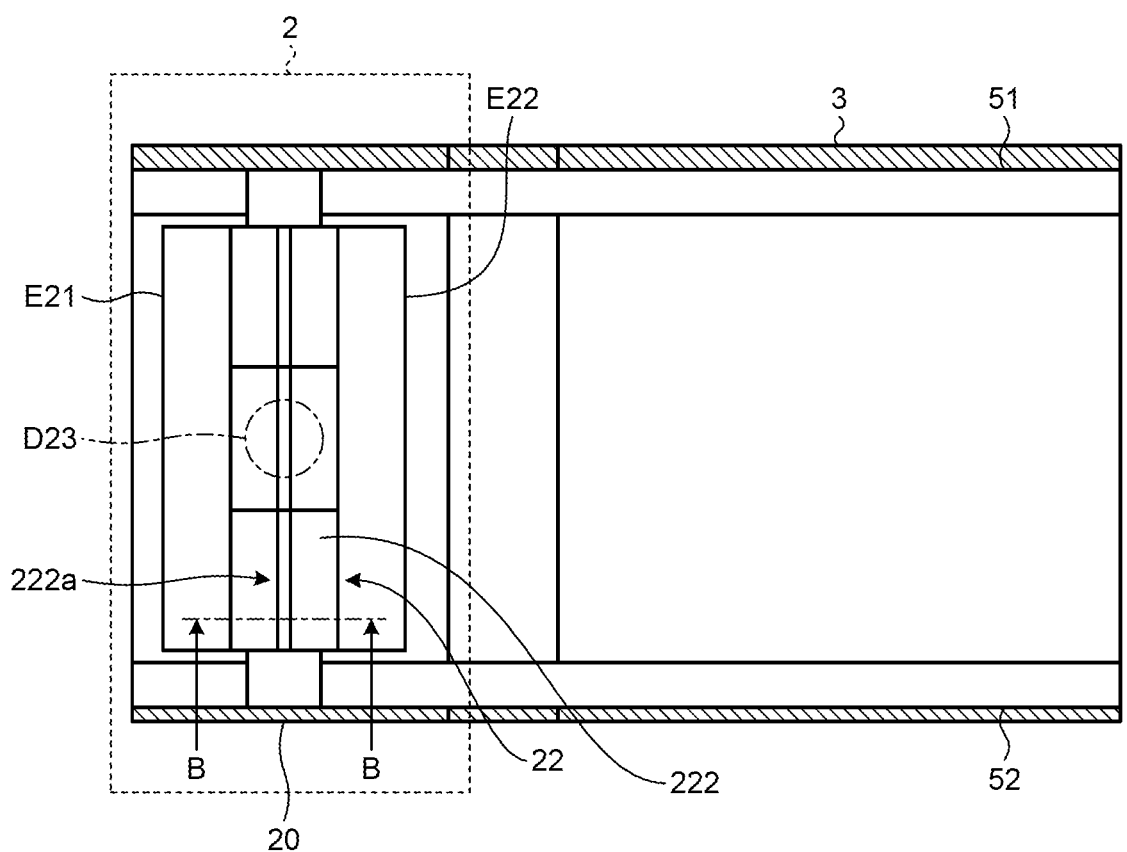
FIG. 2 is a cross-sectional view of the film manufacturing apparatus corresponding to a cross section across the line A-A illustrated in FIG. 1.

FIG. 1 is a schematic illustrating a configuration of a film manufacturing apparatus provided with a blowoff nozzle according to one embodiment of the present invention. FIG. 2 is a cross-sectional view of the film manufacturing apparatus corresponding to a cross section across the line A-A illustrated in FIG. 1. This film manufacturing apparatus 1 illustrated in FIGS. 1 and 2 is provided with an airflow controller 2 and a tenter oven 3. The film manufacturing apparatus 1 is a stretched film manufacturing apparatus that uses the sequential biaxial stretching or the simultaneous biaxial stretching, and feeds an unstretched film made of thermoplastic resin into the tenter oven 3 and stretches an unstretched film 100 inside the tenter oven 3 in at least one of the longitudinal and width directions. In FIG. 1, the longitudinal direction of the film 100 is the film conveying direction FR, and corresponds to the left-to-right direction in the drawing. The width direction of the film 100 (film width direction) is a direction perpendicular to the longitudinal direction and the thickness direction of the film (the up-and-down direction on the paper surface), and corresponds to a direction perpendicular to the paper surface.

The airflow controller 2 is installed at a prior stage of the tenter oven 3, in the conveying direction of the film 100. After passing through the airflow controller, the film 100 to be stretched is carried into the tenter oven 3. The airflow controller 2 is connected to the tenter oven 3 via a connector 4.

The film to which the airflow controller 2 according to the present invention is applied is not limited to a particular film, and any known thermoplastic film heated and stretched inside the tenter oven 3 may be applied.

The inside of the tenter oven 3 is heated to a set temperature when the film 100 is to be stretched. The tenter oven 3 has one end connected to the connector 4, and has the other end provided with an opening through which the film 100 is discharged to the outside.

The airflow controller 2 includes a first blowoff nozzle 21 facing one surface of the film 100 (the top surface in FIG. 1) and a second blowoff nozzle 22 facing the other surface of the film 100 (the bottom surface in FIG. 1). Hereinafter, the "first blowoff nozzle 21" will be simply referred to as a "blowoff nozzle 21". The "second blowoff nozzle 22" will be simply referred to as a "blowoff nozzle 22". The blowoff nozzles 21 and 22 blow out the air to the respective surfaces of the film 100, the surfaces being surfaces facing the blowoff nozzles 21 and 22. The blowoff nozzles 21 and 22 are housed in a box-shaped body 20. The box-shaped body 20 has one end connected to the connector 4 in the conveying direction of the film 100, and has the other end provided with an opening through which the film 100 is fed from the outside. Although a pair of blowoff nozzles facing each other is effective, the effectiveness can be improved further by providing the blowoff nozzles in a plurality of pairs.

The airflow controller 2 is provided with blowers B1 and B2, as air supply sources to the blowoff nozzles 21 and 22, respectively, heat exchangers H1 and H2, and exhaust mechanisms E1 and E2. The blower B1 sucks the external air, and blows out the airs. The heat exchanger H1 heats the air blown out of the blower B1. The exhaust mechanism E1 stores the air heated by the heat exchanger H1, and sends the air to the blower B1. The blower B2, the heat exchanger H2, and the exhaust mechanism E2 have the same functions as those of the blower B1, the heat exchanger H1, and the exhaust mechanism E1, respectively, as described above.

The blower B1 and the exhaust mechanism E1 are connected via a duct D11. The blower B1 and the heat exchanger H1 are connected via a duct D12. The heat exchanger H1 and the blowoff nozzle 21 are connected via a duct D13. In the airflow controller 2, the air blown out of the blower B1 is heated in the heat exchanger H1, and the heated air is sent to the blowoff nozzle 21 via the duct D13. The blowoff nozzle 21 blows out the air fed via the duct D13. The exhaust mechanism E1 has exhaust units E11 and E12 that suck the air blown out of the blowoff nozzle 21, and the air carried by the MD flow. The exhaust units E11 and E12 are provided with openings, respectively, through which the air is sucked into the exhaust mechanism E1. These openings are provided as holes or slits. In this embodiment, the exhaust unit E11 is provided at the prior stage, and the exhaust unit E12 is provided at the subsequent stage of the blowoff nozzle 21, in the longitudinal direction (conveying direction FR) of the film 100.

The blower B2 and the exhaust mechanism E2 are connected via a duct D21. The blower B2 and the heat exchanger H2 are connected via a duct D22. The heat exchanger H2 and the blowoff nozzle 22 are connected via a duct D23. In the airflow controller 2, the air blown out of the blower B2 is heated in the heat exchanger H2, and the heated air is sent to the blowoff nozzle 22 via the duct D23. The blowoff nozzle 22 blows out the air fed via the duct D23. The exhaust mechanism E2 includes exhaust units E21 and E22 that suck the air blown out of the blowoff nozzle 22 and carried by the MD flow. The exhaust units E21 and E22 are provided with openings, respectively, through which the air is sucked into the exhaust mechanism E2, and the openings are provided as holes or slits. In this embodiment, in the longitudinal direction (conveying direction FR) of the film 100, the exhaust unit E21 is provided at the prior stage, and the exhaust unit E22 is provided at the subsequent stage of the blowoff nozzle 22.

Air supply dampers (not illustrated) may be installed in the ducts D13 and D23, respectively, and the amount of the blown-out air may be adjusted by changing the degree by which this air supply damper is opened. The air supply damper may be replaced with a valve, a valve, or an orifice. By adjusting the amount of the air blown out of the blowoff nozzles 21 and 22, it is possible to reduce the amount of energy used for heating the air.

Exhaust dampers (not illustrated) may be installed in the ducts D11 and D21, respectively, and the amount of the air sucked into the exhaust units E11, E12, E21, and E22 may be adjusted by changing the degree by which this air supply damper is opened. The exhaust damper may be replaced with a valve, a valve, or an orifice. By adjusting the amount of the air sucked by the exhaust units E11, E12, E21, and E22, it is possible to reduce a thermal loss.

In general, in order to use the film 100 to be conveyed having a different width based on the type of the film 100 to be manufactured, the distance between rail covers 51 and 52 covering clips and clip rails (not illustrated) for holding the respective ends of the film 100 in the tenter oven 3 is increased or decreased in the width direction. The rail covers 51 and 52 and the blowoff nozzles 21 and 22 are provided at positions not interfering each other. For example, if the distance between the blowoff nozzles 21 and 22 disposed facing each other with the film 100 therebetween is smaller than the height of the rail covers 51 and 52 (the distance in the thickness direction of the film 100), it is preferable to provide a mechanism that can increase or decrease the width of the blowoff nozzles 21 and 22, in accordance with the width of the film 100 so that the rail covers 51 and 52 do not interfere with the blowoff nozzles 21 and 22. When the width of the film 100 is increased, it is possible to form an air curtain that extends in the film width direction by extending the length of the blowoff nozzles 21 and 22 in the film width direction, while avoiding contact or interference with the rail covers 51 and 52.

Figure 3:
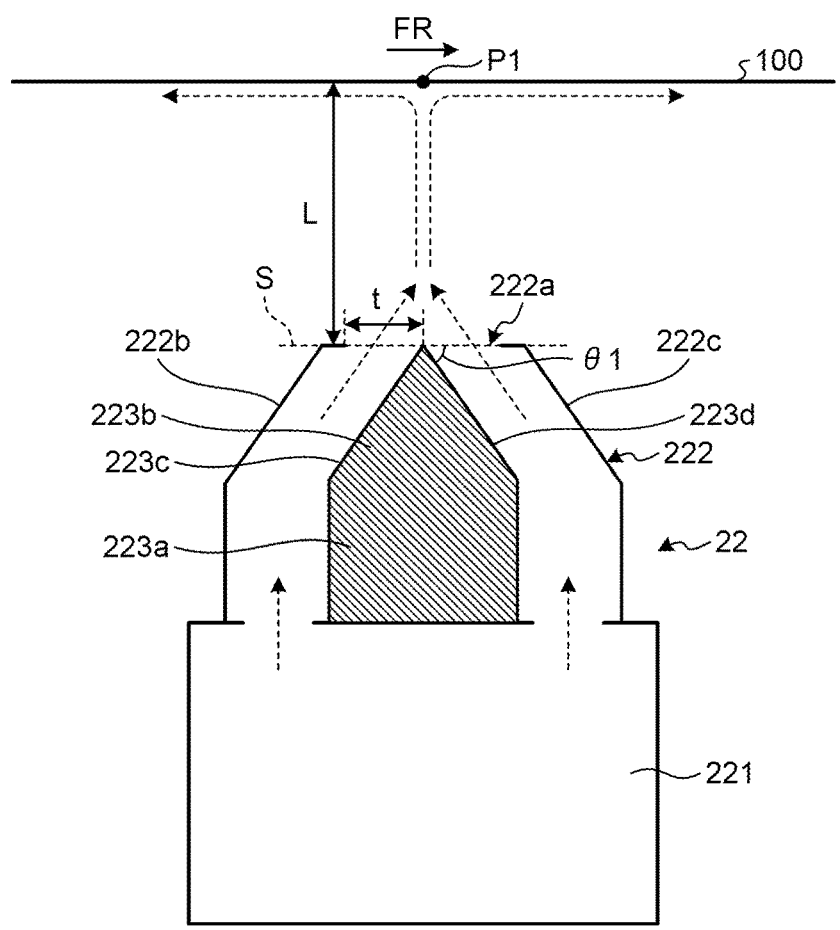
FIG. 3 is a cross-sectional view of the blowoff nozzle corresponding to a cross section across the line B-B illustrated in FIG. 2.

A configuration of the blowoff nozzle will now be explained. FIG. 3 is a cross-sectional view of the blowoff nozzle corresponding to the cross section across the line B-B illustrated in FIG. 2. In the explanation of FIG. 3, a configuration of the blowoff nozzle 22 will be used as an example, but the blowoff nozzle 21 has the same configuration. The blowoff nozzle 22 includes a pressure equalizing chamber 221 to which the air is supplied via the duct D23, a blowoff unit 222 that extends from the pressure equalizing chamber 221 and blows out the air, and a flow divider unit 223 that is provided inside the blowoff unit 222 and divides the flow path of the air blown out of the blowoff unit 222.

The blowoff unit 222 has an opening 222a for blowing out the air toward a side opposite to the side connected to the pressure equalizing chamber 221. The opening 222a is provided as a slit extending in the film width direction (see FIG. 2). The air blowing opening 222a may also be a plurality of holes lined up in the film width direction, instead of being a slit. An end face of the blowoff unit 222, the end face being provided with the opening 222a, is laid in parallel with the conveying direction FR of the film 100. A part of each side surface of the blowoff unit 222, the part being that on the side of the opening 222a, is provided with inclined surfaces 222b and 222c inclined with respect to the conveying direction FR of the film 100. The inclined surfaces 222b and 222c are inclined in a manner being closer to each other toward the opening surface of the opening 222a. The blowoff unit 222 may also be a hollow prism-like shape without the inclined surfaces 222b and 222c.

The flow divider unit 223 has inclined surfaces having inclined ends on the side of opening 222a, being inclined with respect to each other toward the opening 222a. Specifically, the flow divider unit 223 has a base portion 223a that extends in a prism-like shape from the pressure equalizing chamber 221, and an internally installed portion 223b that is provided inside the blowoff unit 222 near the position where the air is blown out and that extends from the base portion 223a toward the opening 222a. The internally installed portion 223b has inclined surfaces 223c and 223d inclined with respect to a virtual plane S that passes through the opening surface of the opening 222a and that extends in parallel with the opening surface. The inclined surfaces 223c and 223d are inclined in a manner being closer to each other toward the opening 222a. The flow divider unit 223 has a pentagonal contour in the cross section illustrated in FIG. 3. The virtual plane S extends in parallel with the conveying direction FR. In this embodiment, the inclined surface 223c extends in parallel with the inclined surface 222b, and the inclined surface 223d extends in parallel with the inclined surface 222c, but it is not always necessary for the inclined surfaces of the blowoff unit 222 to be in parallel with the inclined surfaces of the flow divider unit 223, respectively.

It is assumed herein that L denotes the distance between the tip of the blowoff unit 222 and the film 100, $\theta 1$ denotes the angle between the inclined surface of the flow divider unit 223 (inclined surface 223d in FIG. 3) and the virtual plane S (where $\theta 1 > 0$), and t denotes the distance between the opening 222a and the flow divider unit 223 on the virtual plane S, in the film conveying direction FR. The distance L, the angle $\theta 1$, and the distance t are determined based on a pressure setting for an air stagnation point P1. The pressure setting is set to 60 Pa, for example, but may be set to any pressure higher than that by which the MD flow can be blocked, without limitation to 60 Pa. The stagnation point P1 corresponds to a position of stagnation formed on the film 100 by the air blown out of the blowoff unit 222.

The ways in which the air blown out of the blowoff nozzles 21 and 22 flows will now be explained, using the blowoff nozzle 22 as an example. The air (hot air) supplied into the blowoff nozzle 22 via the duct D23 is blown out of the opening 222a toward the film 100. The flow divider unit 223 controls the blowing direction of the air blown out of the opening 222a. The flow divider unit 223 causes the air blown out from the upstream side of the conveying direction FR to blow toward the downstream with respect to the film 100. The flow divider unit 223 causes the air blown out from the downstream side of the conveying direction FR to blow toward the upstream with respect to the film 100. The air blown out on the upstream side and the air blown out on the downstream side travel in directions crossing each other, and become merged with each other between the blowoff nozzle 22 and the film 100. Through this merging of the air, the air pressure is increased, and the air volume per unit time is increased. After being merged, the air travels in a direction perpendicular to the conveying direction FR of the film 100, and hits the film 100. The air then changes its flowing direction to the upstream and the downstream sides in the conveying direction of the film 100, and collide with the incoming air flowing into the box-shaped body 20 and is turned into return air. The return air is then sucked into the exhaust units E21 and E22 (see FIG. 1), respectively. The air blown out of the blowoff nozzle 21 is also sucked into the exhaust units E11 and E12 in the same manner.

At this time, as the incoming air from the outside of the apparatus along the bottom surface of the film 100 as well as the accompanying flow generated in the film conveying direction flow into the box-shaped body 20 through the film feeding opening of the airflow controller 2, the incoming air is blocked by the air blown out of the blowoff nozzle 22, has its flowing direction changed, and is sucked into the exhaust unit E21, together with the return air. In the manner described above, because the exhaust unit E21 sucks the incoming air from the outside of the apparatus, the incoming air from the outside of the airflow controller 2 is prevented from flowing into the tenter oven 3 and from resulting in temperature unevenness in the tenter oven 3. The same applies to the incoming air arriving from the outside the apparatus along the top surface of the film 100 and flowing into the box-shaped body 20 through the film feeding opening.

When the incoming air from the tenter oven 3 passes through a discharge opening of the airflow controller 2 (through the connector 4) along the bottom side of the film 100 and flows into the box-shaped body 20, the incoming air is blocked by the air curtain formed by the air blown out of the blowoff nozzle 22, has its flowing direction changed, and is sucked into the exhaust unit E22, together with the return air. In this manner, by causing the exhaust unit E22 to suck the incoming air from the tenter oven 3, it is possible to prevent the air heated in the chamber of the tenter oven 3 from being blown out of the tenter oven 3, and raising the temperature of the working area around the tenter oven 3 and deteriorating the work environment around the tenter oven 3. It is also possible to prevent sublimates from the film 100 from depositing and adhering to the surface of the film 100 outside the chamber of the tenter oven 3, and to prevent defects resultant of such foreign substances from reducing the productivity. The same applies to the incoming air from the tenter oven 3 passing along the top surface of the film 100 and flowing into the box-shaped body 20.

As explained above, the blowoff nozzles 21 and 22 are disposed in a manner facing the surfaces of the film 100, respectively. If the blowoff nozzle is installed only on one side of the film 100, the MD flow is allowed to flow more easily on the side on which the blowoff nozzle is not installed, and the airflow blocking effect will be reduced. Thermoplastic films do not allow the air to pass there through, unlike a material such as a fabric. Therefore, when the air is blown to the film 100 from only one side, the wind pressure of the air causes the film 100 to be blown up or down, and causes the film 100 to flap more.

To prevent the film 100 from flapping, the blowoff nozzles are installed on one side and the other side of the film 100, respectively, and the opening of the blowoff nozzle on the one side and the opening of the blowoff nozzle on the other side are configured to face each other with the film 100 therebetween. Because the openings face each other, the airflows therefrom exert the effect of pressing the same position of the film 100 from the one side and the other side, and prevent the film from flapping. The openings facing each other herein means that a projection of the opening of the blowoff nozzle on one side onto the film 100 overlaps at least partially with a projection of the opening of the blowoff nozzle on the other side onto the film 100. At this time, it is more preferable for both of these projections to overlap with each other completely when these openings have the same size.

The airflow controller 2 is an apparatus for decoupling and controlling the airflows between an opening for feeding the film 100 into the tenter oven 3 and the outside of the tenter oven 3. Therefore, when the airflow controller 2 is installed adjacently to the tenter oven 3 on the upstream side of the conveying direction of the film 100, the temperature of the air blown out of the blowoff nozzle is preferably set equal to or higher than that of the air outside the chamber of the tenter oven 3, near the feeding opening of the tenter oven 3. In this manner, excessive cooling of the film 100 is prevented so that the preheating process in the tenter oven is prevented from being adversely affected. Furthermore, when the airflow controller 2 is installed adjacently to the tenter oven 3 on the downstream side of the conveying direction FR of the film 100, the air temperature blown out of the blowoff nozzle is preferably set equal to or higher than the air temperature outside the chamber of the tenter oven 3 near the discharging opening of the tenter oven 3. In this manner, excessive cooling of the film 100 is prevented so that a process downstream to the tenter oven 3 is prevented from being adversely affected. The temperature of the air blown out of the blowoff nozzle is preferably set equal to or lower than the glass transition point of the film 100. In this manner, changes in the crystal structure of the film 100 made of thermoplastic resin are suppressed.

In the embodiment described above, the flow divider unit having inclined surfaces is provided inside the blowoff nozzles 21 and 22, and the air blown out of the blowoff unit is divided and then merged between the blowoff unit and the film 100 before the air hits the film 100. The air blown out of the blowoff nozzles 21 and 22 has its air pressure increased by being merged, and forms the air curtain for blocking the MD flow. According to this embodiment, because the air having its air pressure increased by being merged is blown to the film 100, even if the distance between the film 100 and the blowoff nozzle is increased, it is possible to suppress the temperature unevenness.

In the embodiment described above, the flow divider unit 223 may be configured not to have the base portion 223a. In such a configuration, the flow divider unit (internally installed portion 223b) is fixed to an inner wall of the blowoff nozzle 22, the inner wall intersecting with the film width direction.

(First Modification)

Figure 4:
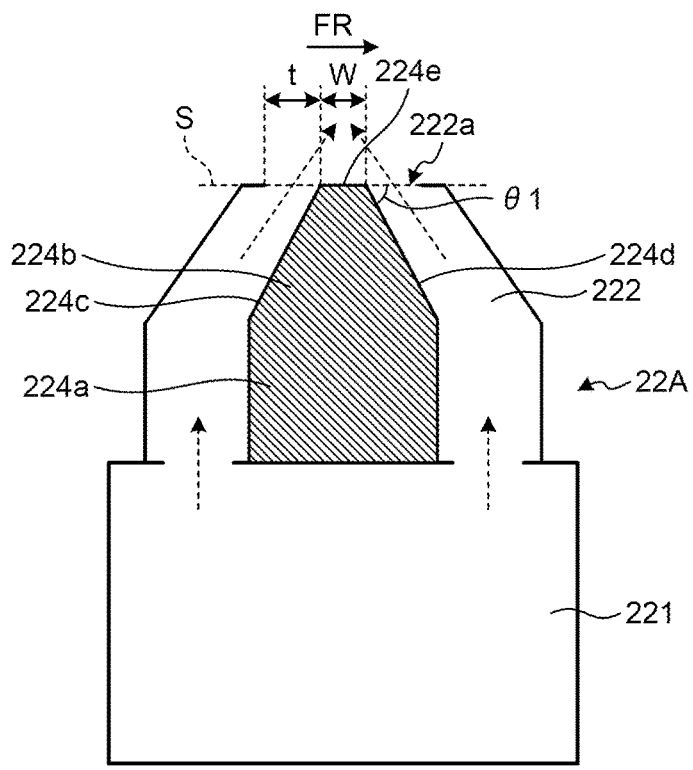
FIG. 4 is a schematic illustrating a configuration of a blowoff nozzle according to a first modification of the present invention.

A first modification of the embodiment will now be explained with reference to FIG. 4. FIG. 4 is a schematic illustrating a configuration of the blowoff nozzle according to a first modification of the embodiment of the present invention. The configuration of the film manufacturing apparatus according to the first modification is the same as that of the film manufacturing apparatus 1 described above, except that the configuration of the blowoff nozzle is changed. The elements that are the same as those explained above will be given the same reference numerals. A configuration of a blowoff nozzle 22A replacing the blowoff nozzle 22 will now be explained, but the blowoff nozzle replacing the blowoff nozzle 21 also has the same configuration.

A blowoff nozzle 22A includes a pressure equalizing chamber 221 to which the air is supplied from the duct D23, a blowoff unit 222 that extends from the pressure equalizing chamber 221 and blows out the air to the outside, and a flow divider unit 224 that is provided inside the blowoff unit 222 and divides the flow path of the air blown out of the blowoff unit 222.

The flow divider unit 224 has inclined surfaces having inclined ends on the side of opening 222a, being inclined with respect to each other toward the opening 222a. Specifically, the flow divider unit 224 has a base portion 224a extending in a prism-like shape from the pressure equalizing chamber 221, and an internally installed portion 224b provided in the blowoff unit 222 and extending from the base portion 224a toward the opening 222a. The internally installed portion 224b has inclined surfaces 224c and 224d that are inclined with respect to the conveying direction of the film 100, and a flat part 224e that has one end connected to the inclined surface 224c and the other end connected to the inclined surface 224d, in the conveying direction FR. The inclined surfaces 224c and 224d are inclined in a manner being closer to each other toward the opening 222a. The flat part 224e extends in parallel with the conveying direction FR, and is positioned on a virtual plane S passing through the opening 222a. The flow divider unit 224 has a trapezoidal contour in the cross section illustrated in FIG. 4. It is preferable for the flat part 224e to be a surface extending in parallel with the virtual plane S, but may also a curved surface extending from the inclined surfaces 224c and 224d, and connecting the inclined surfaces 224c and 224d.

It is assumed herein that W denotes the distance of the flat part 224e in the conveying direction FR. The distance L, the angle θ1, the distance t, and the distance W are determined based on the pressure setting at the air stagnation point P1 (see FIG. 3).

In first modification described above, too, a flow divider unit 224 with inclined surfaces is provided to divide the air blown out of the blowoff unit 222, to merge the air between the blowoff nozzle 22A and the film 100, to apply the merged air to the film 100. According to the first modification, because the air having its air pressure increased by being merged is blown to the film 100, even if the distance between the film 100 and the blowoff nozzle is increased, it is possible to suppress the temperature unevenness.

In the first modification described above, the flow divider unit 224 may be configured not to have the base portion 224a. In such a configuration, the flow divider unit (internally installed portion 224b) may be fixed to an inner wall that intersects with the film width direction in the blowoff nozzle 22A.

(Second Modification)

Figure 5:
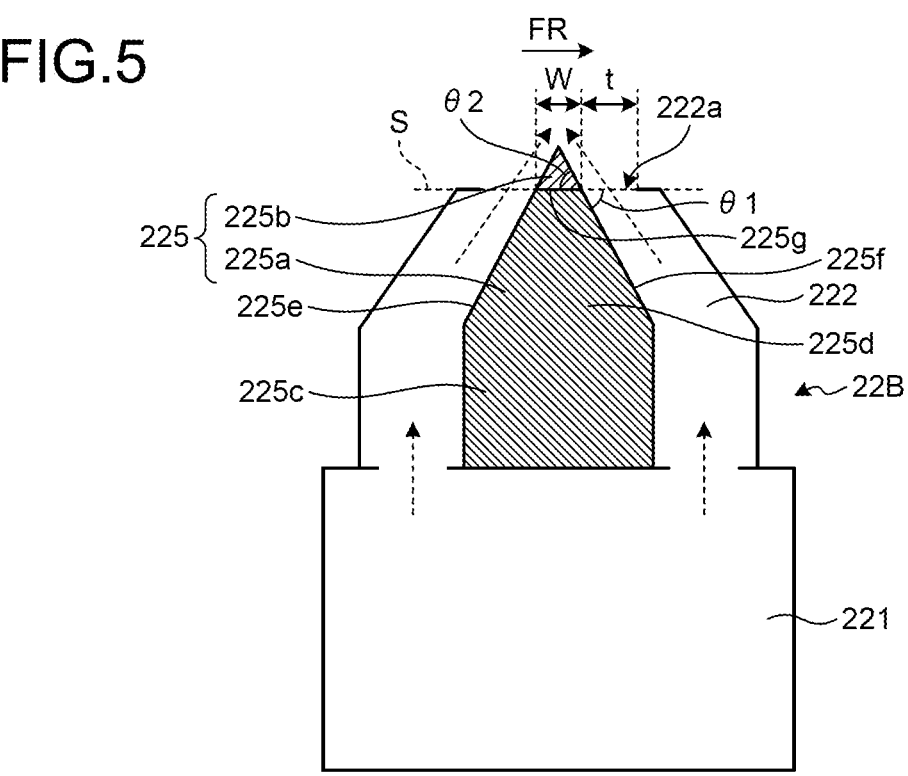
FIG. 5 is a schematic illustrating a configuration of a blowoff nozzle according to a second modification of the present invention.

A second modification of the embodiment will now be explained with reference to FIG. 5. FIG. 5 is a schematic illustrating a configuration of the blowoff nozzle according to a second modification of the embodiment of the present invention. The configuration of the film manufacturing apparatus according to the second modification is the same as that of the film manufacturing apparatus 1 described above, except that the configuration of the blowoff nozzle is changed. The elements that are the same as those explained above will be given the same reference numerals. A configuration of a blowoff nozzle 22B replacing the blowoff nozzle 22 will now be explained, but the blowoff nozzle replacing the blowoff nozzle 21 also has the same configuration.

The blowoff nozzle 22B includes a pressure equalizing chamber 221 to which the air is supplied from the duct D23, a blowoff unit 222 that extends from the pressure equalizing chamber 221 and blows out the air to the outside, and a flow divider unit 225 that divides the flow path of the air blown out of the blowoff unit 222.

The flow divider unit 225 has a part protruding from the inside of the blowoff unit 222, and having inclined surfaces inclined with respect to each other toward the side opposite to the pressure equalizing chamber 221. Specifically, the flow divider unit 225 has an internal flow divider unit 225a provided inside of the blowoff unit 222 and dividing the air flow, and an external flow divider unit 225b protruding from the blowoff unit 222 and dividing the air flow. The flow divider unit 225 has a pentagonal contour in the cross section illustrated in FIG. 5.

The internal flow divider unit 225a has a base portion 225c extending from the pressure equalizing chamber 221, and an internally installed portion 225d installed inside the blowoff unit 222 and extending from the base portion 225c toward the opening 222a. The internally installed portion 225d has inclined surfaces 225e and 225f that are inclined with respect to the virtual plane S, and a connected portion 225g that has one end being continuous to the inclined surface 225e and the other end being continuous to the inclined surface 225f, and that is connected to the external flow divider unit 225b, in the conveying direction FR. The inclined surfaces 225e and 225f are inclined in a manner being closer to each other toward the opening 222a. The connected portion 225g extends in parallel with the conveying direction FR, and is positioned on the virtual plane S passing through the opening 222a.

The external flow divider unit 225b has a triangular prism shape extending in the film width direction, and has two inclined surfaces that are inclined with respect to the virtual plane S. The tip of the external flow divider unit 225b may have a flat surface extending in parallel with the virtual plane S, or a curved surface. In FIG. 5, the inclined surfaces of the external flow divider unit 225b are inclined with respect to the virtual plane S at the same angle as that at which the inclined surfaces 225e and 225f are inclined, but may be inclined at a different angle. The external flow divider unit 225b corresponds to a protruding portion.

It is assumed herein that W denotes the distance of the connected portion 225g in the conveying direction FR, θ1 denotes the angle between the inclined surface of the internal flow divider unit 225a (the inclined surface 225f in FIG. 5) and the virtual surface S (where θ1>0), and θ2 denotes the angle between the inclined surface of the external flow divider unit 225b and the virtual surface S (where θ2>0). The distance L, the angles θ1 and θ2, the distance t, and the distance W are determined based on the pressure setting at the air stagnation point P1 (see FIG. 3). The distance L in the second modification is the distance between the tip of the external flow divider unit 225b and the film 100.

In the second modification described above, too, the flow divider unit 225 having the inclined surfaces is provided to divide the air blown out of the blowoff unit 222, to merge the divided air between the blowoff nozzle and the film 100, and to apply the merged air to the film 100. According to the second modification, because the air having its air pressure increased by being merged is blown to the film 100, even if the distance between the film 100 and the blowoff nozzle is increased, it is possible to suppress the temperature unevenness.

Explained in the second modification is an example in which the external flow divider unit 225b is continuous to the connected portion 225g, but the blowoff unit 222 may be provided with two openings extending in the film width direction, and external flow divider unit 225b may be supported on the outer surface of the blowoff unit 222 between these openings. Furthermore, the internal flow divider unit 225a may also be supported by the inner wall of the blowoff unit 222 between the openings.

In the second modification, the internal flow divider unit 225a and the external flow divider unit 225b may be integrally formed.

(Third Modification)

Figure 6:
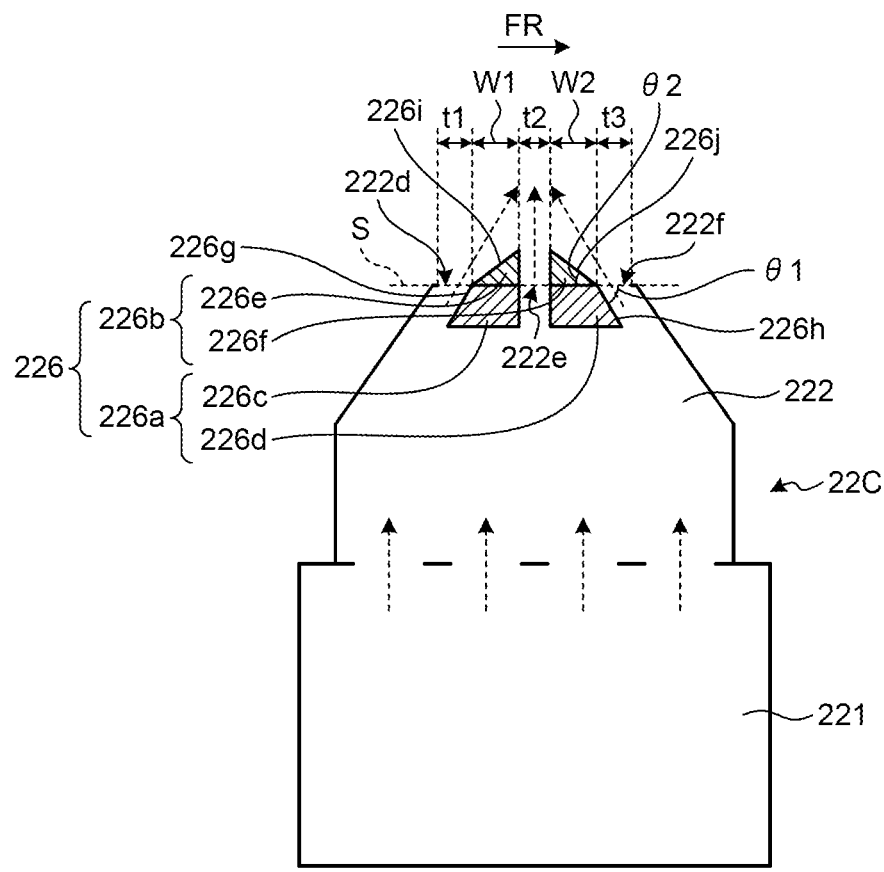
FIG. 6 is a schematic illustrating a configuration of the blowoff nozzle according to a third modification of the present invention.

A third modification of the embodiment will now be explained with reference to FIG. 6. FIG. 6 is a schematic illustrating a configuration of the blowoff nozzle according to the third modification of the embodiment of the present invention. The configuration of the film manufacturing apparatus according to the third modification is the same as that of the film manufacturing apparatus 1 described above, except that the configuration of the blowoff nozzle is changed. The elements that are the same as those explained above will be given the same reference numerals. A configuration of a blowoff nozzle 22C replacing the blowoff nozzle 22 will now be explained, but the blowoff nozzle replacing the blowoff nozzle 21 also has the same configuration.

The blowoff nozzle 22C includes a pressure equalizing chamber 221 to which the air is supplied from the duct D23, a blowoff unit 222 that extends from the pressure equalizing chamber 221 and blows out the air, and a flow divider unit 226 that divides the flow path of the air blown out of the blowoff unit 222.

The blowoff unit 222 in the blowoff nozzle 22C is provided with three openings (openings 222d to 222f). The openings 222d to 222f all have a hole shape extending in the film width direction. The openings 222d to 222f are lined up sequentially in the order of the openings 222d, 222e, 222f from the upstream side in the conveying direction FR.

The flow divider unit 226 has a part protruding from the inside of the blowoff unit 222, and having inclined surfaces inclined with respect to each other toward the side opposite to the pressure equalizing chamber 221. Specifically, the flow divider unit 226 has internally installed portions 226a provided inside the blowoff unit 222 and protruding portions 226b protruding from the blowoff unit 222. The internally installed portions 226a are supported on inner walls of the blowoff unit 222, between the openings 222d and 222e and between the openings 222e and 222f, respectively. The protruding portions 226b are supported on outer surfaces of the blowoff unit 222, between the openings 222d and 222e and between the openings 222e and 222f, respectively.

The internally installed portions 226a include a first internally installed portion 226c provided upstream and a second internally installed portion 226d provided downstream, in the conveying direction FR.

The protruding portions 226b include a first protruding portion 226e provided upstream and a second protruding portion 226f provided downstream, in the conveying direction FR.

The first internally installed portion 226c has an inclined surface 226g on the side of the opening 222d.

The second internally installed portion 226d has an inclined surface 226h on the side of the opening 222f.

The inclined surfaces 226g and 226h are both inclined with respect to the virtual plane S, and inclined in a manner being closer to each other toward the opening 222a.

The first protruding portion 226e has an inclined surface 226i that is continuous to the inclined surface 226g.

The second protruding portion 226f has an inclined surface 226j that is continuous to the inclined surface 226h.

The inclined surfaces 226i and 226j are both inclined with respect to the virtual plane S, with the inclined surface 226i inclined toward the opening 222d and the inclined surface 226j inclined toward the opening 222f, in a manner being away from each other. In other words, the inclined surfaces 226i and 226j are inclined in a manner being closer to each other toward the end (tip) on the opposite side of the internally installed portion 226a. The tip of each of the first protruding portion 226e and the second protruding portion 226f may be in parallel with the virtual plane S, or have a curved surface. In FIG. 6, the inclined surface 226i forms an angle different from that formed by the inclined surface 226g with the virtual plane S, but these angles may also be the same. The same applies to the inclination angles of inclined surface 226j and the inclined surface 226h.

The internally installed portion 226a and the protruding portion 226b have wall surfaces that are perpendicular to the conveying direction FR, on the side of the opening 222e disposed at the center in the conveying direction FR, among the openings 222d to 222f. These walls may also be inclined with respect to the conveying direction FR, and the walls of the internally installed portions 226a may be inclined at an angle different from that at which the walls of the protruding portions 226b are inclined.

It is assumed herein that t1 to t3 denote the distances of the openings 222d to 222f in the conveying direction FR, respectively, W1 denotes the distance between the opening 222d and the opening 222e, W2 denotes the distance between the opening 222e and the opening 222f, θ1 denotes the angle formed by the inclined surface of the internally installed portion 226a (inclined surface 226h in FIG. 6) and the virtual plane S (where θ1>0), and θ2 denotes the angle formed by the inclined surface of the protruding portion 226b (inclined surface 226j in FIG. 6) and the virtual plane S (where θ2>0). The distance L, the angles θ1 and θ2, the distances t1 to t3, and the distances W1 and W2 are determined based on the pressure setting at the air stagnation point P1 (see FIG. 3). The distance L in the third modification is the distance between the tips of the protruding portions 226b and the film 100. The distances t1 to t3 may all be the same length or different lengths, but the distances t1 and t3 are preferably the same length.

In the third modification described above, too, the flow divider unit 226 having the inclined surfaces is provided, to divide the air blown out of the blowoff unit 222, to merge the divided air between the blowoff nozzle and the film 100, and to apply the merged air to the film 100. According to the third modification, because the air having its air pressure increased by being merged is blown to the film 100, even if the distance between the film 100 and the blowoff nozzle is increased, it is possible to suppress the temperature unevenness.

In the third modification described above, a configuration not having the protruding portion 226b is also possible. In this case, the flow divider unit 226 only includes the internally installed portion 226a (the first internally installed portion 226c and the second internally installed portion 226d).

In the embodiment and the first to the third modifications described above, the inclined surfaces provided to the flow divider unit are explained to be flat surfaces, but without limitation thereto, the inclined surfaces may also be curved or waved surfaces.

EXAMPLES

With examples below, the present invention will be explained in further detail. However, these examples are not intended to limit the interpretations of the present invention in any way.

[Analysis 1]

In the following examples, for each of the exemplary configurations described above, the parameters of the blowoff nozzle were set and the air pressure (air volume) was analyzed. In the analyses, the air volume at the stagnation point described above at the time when the air pressure reached 60 Pa was obtained. In the example, when the obtained air volume was smaller than that of a comparison target, it was determined that the result was good if the effect of increasing air volume was observed, as a blowoff nozzle, and it was determined that the result was not good if not.

Example 1

For the blowoff nozzle 22 illustrated in FIG. 3, an analysis was carried out by setting the distance t to 12 mm, the distance L to 150 mm, and the angle θ1 to 70 degrees. The parameters and the analysis result are indicated in Table 1.

Example 5

An analysis was carried out using the same parameters as those used in Example 4, except that the distance W was set to 10 mm. The parameters and the analysis result are indicated in Table 1.

Comparative Example 1

Figure 7:
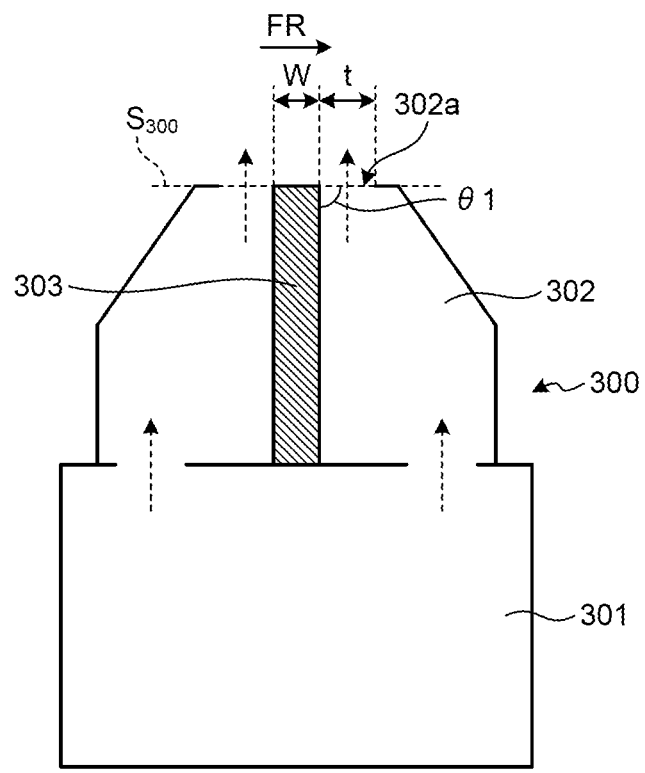
FIG. 7 is a schematic illustrating a configuration of a blowoff nozzle according to a comparative example.

An analysis was carried out using a blowoff nozzle 300 illustrated in FIG. 7. FIG. 7 is a schematic illustrating a configuration of the blowoff nozzle according to a comparative example. The blowoff nozzle 300 includes a pressure equalizing chamber 301 to which air is supplied from the duct D23, a blowoff unit 302 that extends from the pressure equalizing chamber 301 and blows out the air from an opening 302a, and a flow divider unit 303 that is provided inside the blowoff unit 302 and divides the flow path of the air blown out of the blowoff unit 302. The flow divider unit 303 extends in a prism-like shape. In the blowoff nozzle 300, L denotes the distance between the tip of the blowoff unit 302 and the film 100, $S_{300}$ denotes the plane passing through the opening surface (end surface) of the blowoff unit 302 in parallel with the opening surface, θ1 denotes the angle formed between the flow divider unit 303 and the virtual plane $S_{300}$ (where θ1>0), and t1 denotes the distance between the opening 302a and the flow divider unit 303 on the virtual plane $S_{300}$, in the film conveying direction FR.

TABLE 1

| | t [mm] | L [mm] | W [mm] | θ1 [deg] | θ2 [deg] | Air Volume Q [m³/min/m] | Determination |
|---|---|---|---|---|---|---|---|
| Example 1 | 12 | 150 | 0 | 70 | None | 12.0 | Good |
| Example 2 | 5 | 150 | 2 | 70 | None | 8.5 | Good |
| Example 3 | 12 | 150 | 2 | 70 | None | 17.2 | Good |
| Example 4 | 12 | 150 | 5 | 70 | 65 | 13.5 | Good |
| Example 5 | 12 | 150 | 10 | 70 | 65 | 14.2 | Good |
| Comparative Example 1 | 5 | 150 | 2 | 90 | None | 9.0 | — |
| Comparative Example 2 | 12 | 150 | 2 | 90 | None | 19.2 | — |
| Comparative Example 3 | 12 | 50 | 2 | 90 | None | 13.5 | No Good (Pressure at stagnation point <60 Pa) |

Example 2

For the blowoff nozzle 22A illustrated in FIG. 4, an analysis was carried out by setting the distance t to 5 mm, the distance L to 150 mm, the distance W to 2 mm, and angle θ1 to 70 degrees. The parameters and the analysis result are indicated in Table 1.

Example 3

An analysis was carried out using the same parameters as those used in Example 2, except that the distance t was set to 12 mm. The parameters and the analysis result are indicated in Table 1.

Example 4

For the blowoff nozzle 22B illustrated in FIG. 5, an analysis was carried out by setting the distance t to 12 mm, the distance L to 150 mm, the distance W to 5 mm, the angle θ1 to 70 degrees, and the angle θ2 to 65 degrees. The parameters and the analysis result are indicated in Table 1.

In Comparative Example 1, an analysis was carried out for the blowoff nozzle 300 by setting the distance t to 5 mm, the distance L to 150 mm, the distance W to 2 mm, and the angle θ1 to 90 degrees. The parameters and the analysis result are indicated in Table 1.

Comparative Example 2

The same parameters as those used in Comparative Example 1 were used for the analysis, except that the distance t was set to 12 mm. The parameters and the analysis result are indicated in Table 1.

Comparative Example 3

The same parameters as those used in Comparative Example 2 were used for the analysis, except that the distance L was set to 50 mm. The parameters and the analysis result are indicated in Table 1.

In Comparative Example 1, an air volume of 9.0 m³/min/m was required to bring the air pressure at the stagnation point to 60 Pa. By contrast, in Example 2 where the same distances t and L were used, the air volume was 8.5 m³/min/m.

In Comparative Example 2, an air volume of 19.2 m³/min/m was required to bring the air pressure at the stagnation point to 60 Pa. By contrast, in Examples 1, 3 to 5 where the same distances t and L were used, the air volumes were smaller than 19.2 m³/min/m. The analysis result for Comparative Example 3 indicated that the wind pressure at the stagnation point did not reach 60 Pa.

Example 6

For the blowoff nozzle 22C illustrated in FIG. 6, an analysis was carried out by setting the distances t1 and t3 to 8 mm, the distance t2 to 8 mm, the distance L to 150 mm, the angle θ1 to 62 degrees, and the angle θ2 to 45 degrees. The parameters and the analysis result are indicated in Table 2.

TABLE 2

|  | t1 and t3 [mm] | t2 [mm] | L [mm] | W [mm] | θ1 [deg] | θ2 [deg] | Air Volume Q [m³/min/m] | Determination |
|---|---|---|---|---|---|---|---|---|
| Example 6 | 8 | 8 | 150 | 2 | 62 | 45 | 14.8 | Good |
| Example 7 | 8 | 8 | 150 | 15 | 62 | 45 | 14.4 | Good |
| Example 8 | 8 | 8 | 150 | 15 | 45 | 45 | 12.3 | Good |
| Example 9 | 8 | 8 | 150 | 15 | 30 | 45 | 10.3 | Good |
| Example 10 | 8 | 8 | 150 | 15 | 80 | 45 | 17.2 | Good |
| Example 11 | 8 | 8 | 150 | 15 | 62 | 30 | 16.1 | Good |
| Example 12 | 8 | 8 | 150 | 15 | 62 | 80 | 15.7 | Good |
| Example 13 | 8 | 8 | 150 | 2 | 80 | 10 | 15.5 | Good |
| Comparative Example 4 | 8 | 8 | 150 | 2 | None | None | Not Measurable | No Good (Unstable air volume) |
| Comparative Example 5 | 8 | 8 | 150 | 15 | None | None | Not Measurable | No Good (Unstable air volume) |
| Comparative Example 6 | 8 | 8 | 150 | 2 | None | 45 | 19.7 | No Good |

Example 7

An analysis was carried out using the same parameters as those used in Example 6, except that the distance W was set to 15 mm. The parameters and the analysis result are indicated in Table 2.

Example 8

An analysis was carried out using the same parameters as those used in Example 7, except that the angle θ1 was set to 45 degrees. The parameters and the analysis result are indicated in Table 2.

Example 9

An analysis was carried out using the same parameters as those used in Example 7, except that the angle θ1 was set to 30 degrees. The parameters and the analysis result are indicated in Table 2.

Example 10

An analysis was carried out using the same parameters as those used in Example 7, except that the angle θ1 was set to 80 degrees. The parameters and the analysis result are indicated in Table 2.

Example 11

An analysis was carried out using the same parameters as those used in Example 7, except that the angle θ2 was set to 30 degrees. The parameters and the analysis result are indicated in Table 2.

Example 12

An analysis was carried out using the same parameters as those used in Example 7, except that the angle θ2 was set to 80 degrees. The parameters and the analysis result are indicated in Table 2.

Example 13

An analysis was carried out using the same parameters as those used in Example 6, except that the angle θ1 was set to 80 degrees, and the angle θ2 was set to 10 degrees. The parameters and the analysis result are indicated in Table 2.

Comparative Example 4

An analysis was carried out using the same parameters as those used in Example 6, except that the configuration was not provided with the flow divider unit 226. The parameters and the analysis result are indicated in Table 2.

Comparative Example 5

The same parameters as those used in Comparative Example 4 were used for the analysis, except that the distance W was set to 15 mm. The parameters and the analysis result are indicated in Table 2.

Comparative Example 6

An analysis was carried out using the same parameters as those used in Example 4, except that the protruding Portion 226b of the flow divider unit 226 was provided, and the angle θ2 was set to 45 degrees. The parameters and the analysis result are indicated in Table 2.

In Examples 6 to 13, air volumes ranging from 10.3 to 17.2 m³/min/m were required to bring the air pressure at the stagnation point to 60 Pa. By contrast, the analysis results of Comparative Examples 4 and 5 indicated the instability of the air volume, so that the determinations of the air volume were not possible. Comparative Example 6 also required an airflow rate of 19.7 m³/min/m.

[Analysis 2]

In Analysis 2, a numerical analysis model different from that used in Analysis 1 was created, and a numerical analysis was performed with this model to evaluate the MD flow blocking performance.

Figure 8:
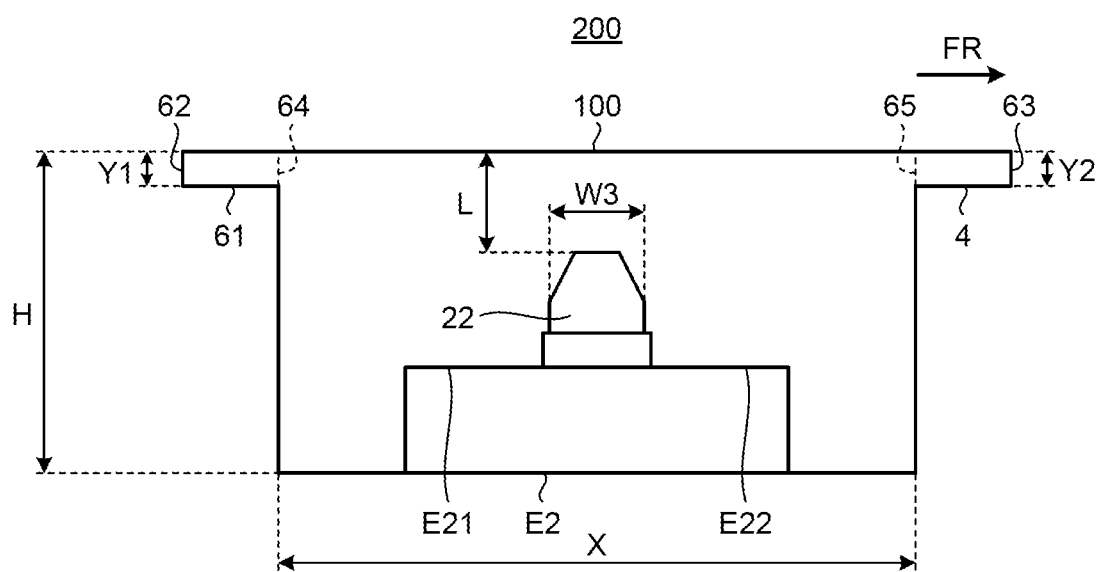
FIG. 8 is a schematic for explaining a numerical analysis model used in a second analysis example.

FIG. 8 illustrates the numerical analysis model used in this analysis. An apparatus model 200 illustrated in FIG. 8 is a model of the chamber including the airflow controller 2 provided with the blowoff nozzle 22 (see FIG. 1, for example), and illustrates a longitudinal section that is in parallel with the film conveying direction FR. In order to save computational resources required in analyzing the internal space of the airflow controller 2, it was assumed that the apparatus model 200 and an outer space 61 were symmetrical in the up-and-down direction with the film 100 therebetween, and the numerical analysis was carried out only for the lower half. In order to evaluate the MD flow blocking performance, it is sufficient to examine the way in which the air flows across a vertical cross section extending in parallel with the film conveying direction FR. Therefore, a numerical analysis was performed using a two-dimensional model across this plane.

The dimensions of the structures were established as follows. A length X of the apparatus model 200 in the film conveying direction FR was set to 1000 mm, and a height H was set to 500 mm. The blowoff nozzle 22 and the exhaust mechanism E2 were installed inside this model. The size W3 of the blowoff nozzle 22 in the film conveying direction FR was set to 200 mm, and the distance L between the film 100 and the blowoff nozzle 22 was set to 150 mm. An outer space 61 was set up on the upstream side of the apparatus model 200 in the film conveying direction, and the connector 4 connected to the tenter oven 3 was set up on the downstream in the film conveying direction. A distance Y1 between the bottom end of the outer space 61 and the film 100 was set to 50 mm, and a distance Y2 between the bottom end of the connector 4 and the film 100 was set to 50 mm.

The outer boundary 62 of the outer space 61 and the inner boundary 63 of the connector 4 were established as pressure boundaries, and atmospheric pressure (0.1 MPa) was set to the outer boundary 62, and −5 Pa was set to the inner boundary 63, as boundary conditions. In addition, the temperature of the outer space 61 was set to 25° C., and the temperature of the tenter oven connected to the connector 4 was set to 125° C. The physical properties of the air were assumed to be those of the dry air at the atmospheric pressure. Boundary conditions under which the air volume at an air pressure of 60 Pa flowed into the stagnation point were set to the blowoff nozzle 22, and the blowout temperature was set to 60° C. Boundary conditions under which the same volume of the air was exhausted as that blown out of the blowoff nozzle were set to the exhaust units E21 and E22.

An average temperature on an evaluation surface 64 between the apparatus model 200 and the outer space 61, and an average temperature on an evaluation surface 65 between the apparatus model 200 and the connector 4, both of which are illustrated in FIG. 8, were used as the indices of the effectiveness of the airflow controller 2.

Under these conditions, when the air supply into and exhaust from the apparatus model 200 were stopped, the air flowed from the outer space 61, passed through the apparatus model 200, and into the connector 4 at an average velocity of 2.0 m/s, and the tenter oven 3 was filled with the cool air at the temperature of 25° C., and caused temperature unevenness in the tenter oven 3.

Example 14

For an analysis, the blowoff nozzle 22 used in Example 1 was placed as the blowoff nozzle 22 of the apparatus model 200. This blowoff nozzle 22 had the distance t of 12 mm and the angle θ1 of 70 degrees. As a result of the analysis, the average temperature on the evaluation surface 64 was 25° C., and the average temperature on the evaluation surface 65 was 125° C. In other words, it was possible to prevent a leakage of the hot air from the apparatus model 200 into the outer space 61, and flowing of the cold air into the tenter oven 3 via the connector 4. Therefore, it can be assumed that the airflow controller 2 succeeded in suppressing the temperature unevenness in the tenter oven 3.

Example 15

For an analysis, the blowoff nozzle 22C used in Example 8 was placed as the blowoff nozzle 22 of the apparatus model 200. In this blowoff nozzle 22, the distances t1 to t3 were set to 8 mm, the angle θ1 was set to 45 degrees, and the angle θ2 was set to 45 degrees. As a result of the analysis, the average temperature on the evaluation surface 64 was 25° C., and the average temperature on the evaluation surface 65 was 125° C. In other words, it was possible to prevent a leakage of the hot air from the apparatus model 200 into the outer space 61, and flowing of the cold air into the tenter oven 3 via the connector 4. Therefore, it can be assumed that the airflow controller 2 succeeded in suppressing the temperature unevenness in the tenter oven 3.

INDUSTRIAL APPLICABILITY

The blowoff nozzle according to the present invention can be applied preferably to the heating and stretching processes in a tenter oven provided to a film manufacturing facility, but the scope of applications is not limited thereto.

REFERENCE SIGNS LIST 1 film manufacturing apparatus
2 airflow controller
3 tenter oven
4 connector
21 first blowoff nozzle (blowoff nozzle)
22, 22A, 22B, 22C second blowoff nozzle (blowoff nozzle)
51, 52 rail cover
61 outer space
62 outer boundary
63 inner boundary
64 evaluation surface on outer space side
65 evaluation surface on connector side
100 film
221 pressure equalizing chamber
222 blowoff unit
223, 224, 225, 226 flow divider unit
223a, 224a, 225c base portion
223b, 224b, 225d, 226a internally installed portion
223c, 223d, 224c, 224d, 225e, 225f, 226g, 226h, 226i, 226j inclined surface
224e flat surface
225a internal flow divider unit
225b external flow divider unit

225g connector
226b protrusion
226c first internally installed portion
226d second internally installed portion
226e first protrusion
226f second protrusion
B1, B2 blower
D11, D12, D13, D21, D22, D23 duct
E1, E2 exhaust mechanism
E11, E12, E21, E22 exhaust unit
H1, H2 heat exchanger
S virtual plane

The invention claimed is:

1. A blowoff nozzle that blows out air to a film being conveyed, the blowoff nozzle comprising:
   an internally installed portion that is provided near a position where the air is blown out, inside the blowoff nozzle, and that has inclined surfaces inclined with respect to a virtual plane passing through an opening surface of an opening of the blowoff nozzle, the opening surface being a surface from which the air is blown out, the inclined surfaces being inclined in a manner being close to each other toward the virtual plane, and
   a protruding portion protruding from the internally installed portion to outside of the opening, the protruding portion having an inclined surface inclined with respect to the virtual plane, wherein:
   the opening of the blowoff nozzle has a slit shape extending in a film width direction,
   the internally installed portion extends in the film width direction, and
   the protruding portion has a triangular prism shape extending in the film width direction.

* * * * *